Nov. 15, 1955  E. D. PARKER ET AL  2,723,494
METHOD OF TREATING LAWNS WITH TOP DRESSING
Filed Dec. 5, 1949  2 Sheets-Sheet 1
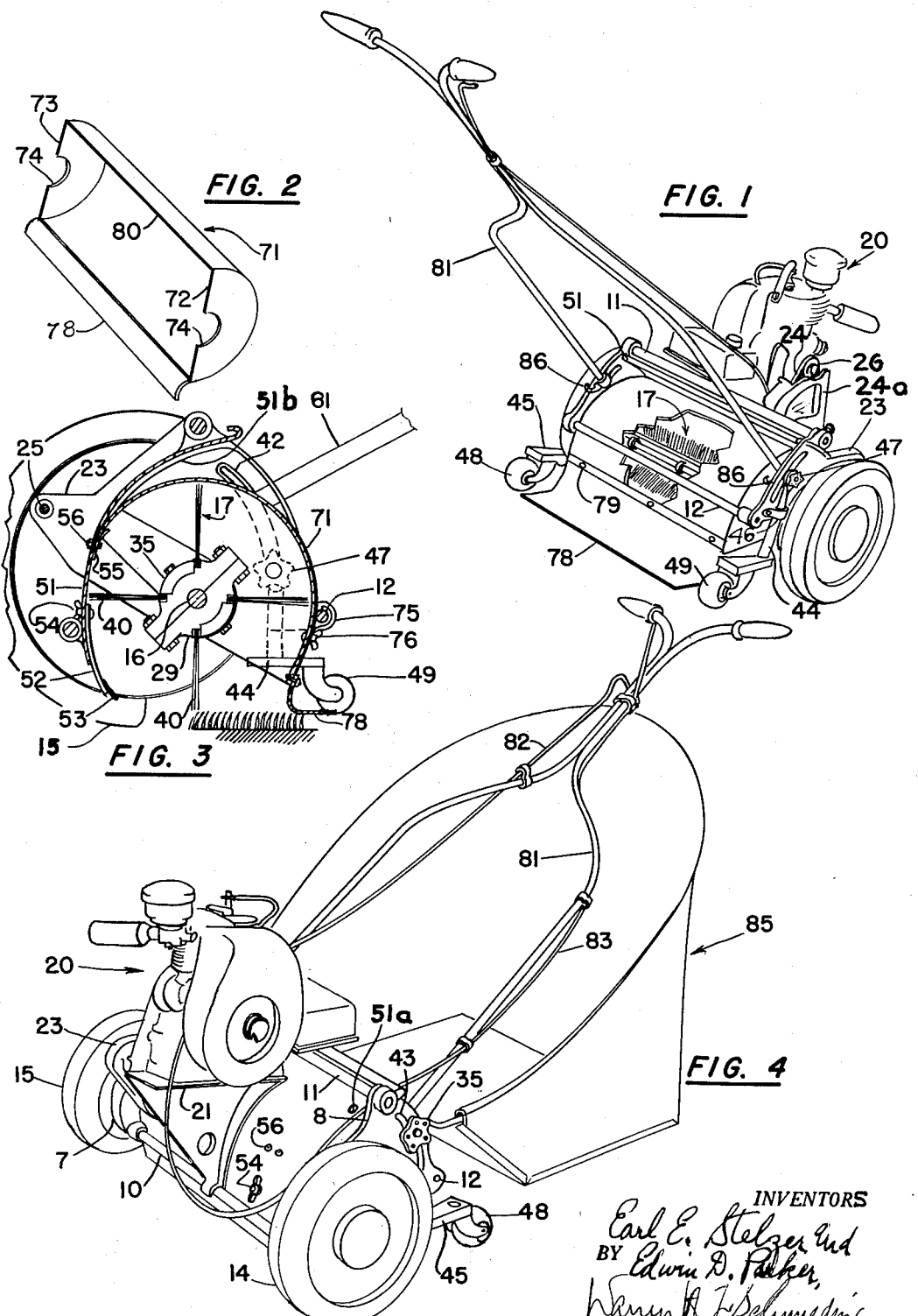
INVENTORS
Earl E. Stelzer and
BY Edwin D. Parker,
Warren H. F. Schmieding
their Attorney Nov. 15, 1955     E. D. PARKER ET AL     2,723,494
METHOD OF TREATING LAWNS WITH TOP DRESSING
Filed Dec. 5, 1949     2 Sheets-Sheet 2

INVENTORS
Carl E. Stelzer and Edwin D. Parker
BY Warren H. F. Schmieding
their Attorney

United States Patent Office 2,723,494
Patented Nov. 15, 1955

2,723,494

METHOD OF TREATING LAWNS WITH TOP DRESSING

Edwin D. Parker and Earl E. Stelzer, Springfield, Ohio, assignors to Parker Sweeper Company, a corporation of Ohio Application December 5, 1949, Serial No. 131,106

14 Claims. (Cl. 47—9)

The present invention relates to the method of cultivating and cleaning lawns, and more particularly to the operation of a machine which can be utilized for sweeping top soil, lying on top of the blades or runners of the lawn, simultaneously lifting the free ends of the grass blades or runners, causing pulverization of the lumps of top soil and causing the pulverized top soil to be embedded between the blades or runners onto the soil, or, can be utilized for sweeping debris off the lawn and collecting the same in a debris receptacle.

More specifically, the present invention contemplates the use of a rotatably mounted brush which is completely enclosed, except at the bottom, with a hood. As the machine is moved over the lawn, the rotating brushes sweep the top dressing, held on top of the grass, into the hood. The brushes rotate at such speed, that upon striking the lumps of top dressing, pulverize the same. Other lumps strike the hood at such velocity as to cause pulverization. The rotating brushes also lift the free ends of the blades or runners and the powdered or pulverized top dressing falls between the lifted blades and runners directly onto the soil. Such parts of the top dressing which are not pulverized by the striking brushes or the striking of the hood are driven downwardly at a relatively high velocity so as to reach the soil.

The hood is formed by two main sections, one of which can be removed on the premises and the machine then utilized as a sweeper. When utilized as a sweeper, a debris receptacle is attached to the machine. The brushes upon rotation pick up the debris such as grass, clippings, leaves, etc. and the hood, remaining on the machine, is utilized for directing the debris into the debris receptacle.

In either operation of the machine, that is, as a disintegrator and spreader of top soil or as a lawn sweeper, the rotating brushes raise the free ends of the blades or runners to facilitate close clipping or trimming of the blades or runners, lift the nap from off the surface to permit aeration of the surface. Thus the machine is particularly useful as a cultivating machine for putting greens on golf courses.

Further objects and advantages of the present invention will be apparent from the following description, reference being had to the accompanying drawings wherein preferred forms of embodiments of the invention are clearly shown.

In the drawings:

Fig. 1 is a perspective view of the machine as seen from the rear, a portion of the rear hood section being broken away to show part of the brush reel;

Fig. 2 is a perspective view of the rear hood section removed from the machine;

Fig. 3 is a broken, vertical sectional view showing one form of the front and rear hood section in the engaged position, and showing the brush reel and part of the frame in elevation;

Fig. 4 is a perspective view of the machine as seen from the front with the rear hood section removed and a debris collecting receptacle attached;

Figure 8:
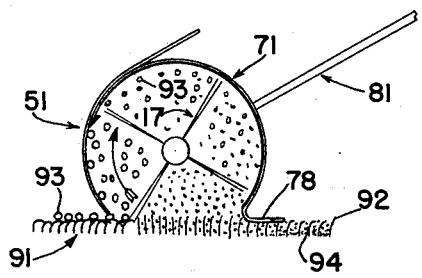
Figure 9:
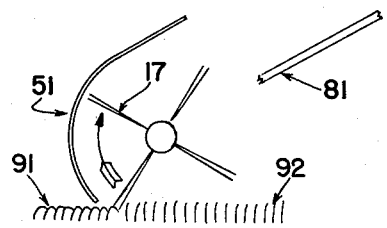

Fig. 8 is a diagrammatic view illustrating the manner in which the sweeper with the front and rear hood sections engaged picks up particles of top dressing from the surface of bent grass or runners, raises the nap of the grass, and deposits the particles around the blades close to the roots; and Fig. 9 is a diagrammatic view of the sweeper with the rear hood section removed and illustrating the raising of the nap to aerate the surface or position the blades to facilitate trimming.

Figure 6:
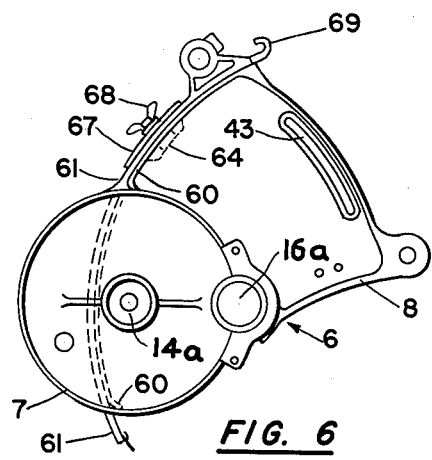
Fig. 6 is a side elevational view of the hood section and side plate as seen from the right side of Fig. 5.

Referring further to the drawings, the machine is provided with a frame which includes a pair of oppositely disposed side plates 6, one of which is shown fully in Fig. 6. Each plate has a gear housing 7 and an integral flange portion 8. The side plates are tied together and braced by a front cross rod 10, a top cross rod 11, and a rear cross rod 12. The wheels 14 and 15 are mounted on axles connected to a drive gear rotatably mounted in each of the housings 7. These drive gears in turn engage a pinion (not shown) connected to each end of shaft 16, Fig. 3, which carries the rotor or brush reel 17. Power to drive the wheels and brush reel is obtained from the gasoline engine indicated generally at 20. The engine is supported upon a frame 21 carried by the front and top cross rods. A gear housing 23 is suitably secured to the right side plate and inwardly thereof. This housing 23 contains a gear mechanism connected to the wheel drive gear and to the pinion gear for the brush shaft 16. The gear mechanism in housing 23 is driven from a pulley driven shaft, indicated at 25 in Fig. 3. Shaft 25 carries a pulley (not shown) which is driven by a belt 24 which in turn is driven by an engine operated pulley 26. A guard 24a is provided alongside belt 24.

Figure 7:
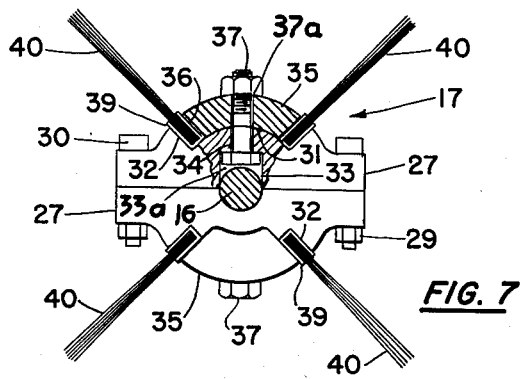
Fig. 7 is an end elevational view, partly in section, showing the clamping means for mounting the brush elements.

Brush reel 17 is preferably constructed, as shown in Fig. 7. The reel 17 includes a pair of clamping members 27 adapted to be clamped around the shaft 16. Each of the members 27 is formed with oppositely disposed flat shoulders drilled to receive the bolts 29 and 30 which serve to clamp members 27 together to grasp the shaft 16. The outer surface of each member is formed with an arcuately shaped center portion 31 which terminates on each side with a shoulder having a flat inner surface 32 projecting at an angle of approximately 45° from vertical or 90° from one another. The center portions 31 are each provided with a semi-circular recessed opening 33 for accommodating shaft 16. A hexagon shaped recess 33a is also formed in each of members 27, centrally thereof, and a drilled hole 34 extends radially of recess 33a. An arcuate shaped outer clamping member 35 is formed to engage on the surface 31 as shown in Fig. 7. Member 35 is formed with sides, as indicated at 36, which slope at the same angle as do the surfaces 32. These collars are also provided with a central opening which aligns with the openings 33 and 34 and recess 33a. A hexagon headed bolt 37a is received through these openings in members 27 and 35. The bolt is prevented from turning since the head thereof is held in place by the walls of the hexagon shaped recess 33a. When the clamping members 35 are drawn down on the center positions 31, by means of the nuts 37, the surfaces 32 and 36 engage and tightly clamp therebetween the U-shaped or channel clamps 39 which hold the wire bristles 40 of the rotor or reel 17. In the preferred construction, a pair of the clamping members 27 are positioned adjacent each end of the shaft 16 to hold the wire bristle clamps 39 and thus form the brush reel.

The brush reel 17 is raised and lowered relative to the grass surface by raising and lowering the rear ends of the side plates which carry the shaft 16, the side plates being free to pivot about relative to the wheels. Referring to Fig. 6, the ball bearing sockets for the traction wheel 14 or 15 and for the shaft 16 are shown at 14a and 16a, respectively. Slots 42 and 43 are provided in the flange portions 8 of the side plates. L-shaped supports 44 and 45, Fig. 1, are mounted within the U clamps 46 connected to the side plates. Each of these supports is drilled at its upper end to receive a bolt fastened through the slots 42 or 43 with a large headed nut 47. The lower ends of the supports 44 and 45 carry the rollers 48 and 49. Thus when the nuts 47 are loosened, the side plates can be raised or lowered to the extent permitted by the slots 42 and 43. When the nuts 47 are tightened, the supports 44 and 45 hold the side plates in the selected position.

The hood for enclosing the brush includes a front hood section 51. The front hood section is of sheet metal formed or held in position as indicated in Figs. 3 and 4. In the construction shown in Figs. 3 and 4, screws 51a are screwed into threaded holes in inwardly extending ledges 51b on the side plates 6. An adjustable extension member 52 is attached to the lower end of this hood section 51 and carries a resilient rubber lip 53 fastened to the bottom of the extension which is adapted to ride over the surface when the extension 52 is lowered. The upper end of extension member 52 is slotted to provide for raising and lowering the extension with respect to the hood section 51. A wing nut, as indicated at 54, is provided for holding the extension in the adjusted position. As seen in Fig. 3, the hood section 51 is positioned close to the ends of the bristles 40 so that particles picked up by the rotation of the bristles are discharged against the inside of hood 51 and carried around the inner surface of the hood. The lowering of the extension 52, close to the ground surface, prevents any particles picked up by the bristles 40 from being discharged forwardly and under the lower edge of hood section 51. The rubber lip 53 flexes to permit the hood section to pass over material to be picked up inside the hood. A bracket 55 is bolted to the inner surface of hood 51 on each side, as indicated at 56 in Figs. 3 and 4.

Figure 5:
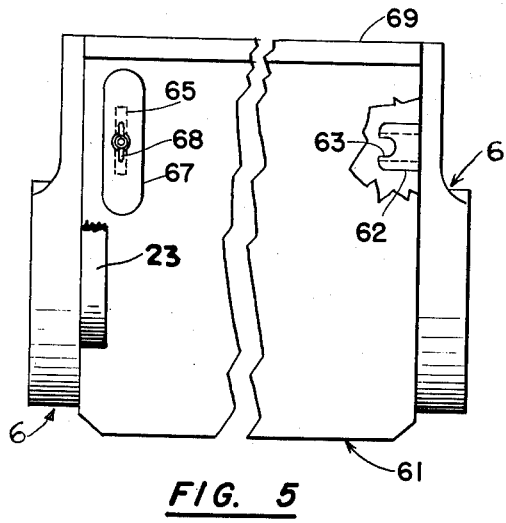
Fig. 5 is a broken, front elevational view showing a modified construction of the front hood section and the means provided to adjust the hood section.

A modified front hood construction is shown in Figs. 5 and 6. In this form the side plates 6 are each provided with a guide member in the form of an arcuate rib 60 projecting inwardly. The front hood section 61 is formed from a thin sheet of metal rolled into an arcuate form. Hood section 61 is adjustable, i. e., can be raised or lowered since it is slideably mounted on the ribs 60. A bracket 62 is formed as an integral part of each side plate. This bracket is slotted at the edge, as indicated at 63, Fig. 5, to receive a square headed bolt 64, Fig. 6. An elongated slot, as indicated at 65 in Fig. 5, is provided in each side of the hood section 61. An arcuate shaped reinforcing bar 67 is drilled at the center. One of these bars engages on the outside of the hood section 61 on each side and holds the hood section in position against the ribs 60. The bolts 64 extend through the openings 63 in the brackets 62, through the slots 65 in the hood section and through the center openings in the bars 67 and are retained with a wing nut 68. The hood section 61 is provided with a finger grip 69 so that it can be raised or lowered to the extent permitted by the slots 65. When the wing nuts 68 are tightened, the bars 67 hold the hood 61 in the position selected.

The rear hood section 71 is semi-cylindrical in form as shown in Fig. 2. The ends of this hood are enclosed with the side walls 72 and 73 which are formed with the openings 74 to provide for fitting hood section 71 around the brush reel 17 as shown in Fig. 3. The forward edge 80 of hood section 71 is adapted to engage with the brackets 55 to hold the hood in engagement with the front hood section 51. A clamp 75 is adjustably connected to the rear of hood section 71 with a wing nut as indicated at 76 in Fig. 3. Thus when the hood 71 is positioned as shown in Fig. 3, clamp 75 engages over the rear cross rod 12. When the wing nut 76 is tightened, the hood section 71 is held in engagement with the front hood 51. The brush is then enclosed at the front, top and rear. A resilient rubber drag member 78 is connected to the lower end of hood 61 with screws as indicated at 79 in Fig. 1 and forms a seal which prevents powdered top dressing or top dressing in the form of dust from escaping when the hoods formed by sections 51 and 71 are in place and the brush operated as seen in Fig. 8.

A handle 81 is connected to the machine to provide for guiding and manipulating. The motor controls, such as the clutch operating lever 82 and the throttle control 83, are carried on the handle in the usual manner. A debris collecting receptacle, indicated generally at 85 in Fig. 4, can be attached to the machine. A pair of brackets 86 fastened to the side plates serve to connect the lower part of the debris receptacle to the machine in the usual manner. The upper part of the receptacle is connectable to the handle by a hook, as on a lawn mower construction.

In operation, the nuts 47 are loosened and the rear ends of side plates adjusted, i. e., raised or lowered, until the bristles 40 contact the surface to be cleaned. When the nuts are tightened, the side plates are held in the adjusted position by the supports 44 and 45. For example, where the grass surface comprises bent grass or runners, as indicated at 91 in Fig. 9, and it is desired to raise the nap to aerate or facilitate close trimming, the machine is operated as follows: the front hood section 51 is adjusted to clear the surface and the rear hood section 71 removed. The side plates are adjusted so that rotation of the brush reel brings the bristles into contact with the grass and provides a combing action which raises the nap as indicated at 92. The debris receptacle can be attached if it is desirable to collect dead runners, loosened by the brush, or to collect leaves, etc.

Where the grass surface 91 has been treated with top dressing, some particles of top dressing are held on top of the grass or runners as indicated at 93 in Fig. 8. For this condition, the machine is operated as follows: the front hood section 51 is adjusted close to the surface to prevent loss of any particles of top dressing picked up by the brush. The brush reel is adjusted until the bristles upon rotation contact the grass with a combing action. The rear hood section is attached and the sweeper moved over the surface 91, by the forward or clockwise (as viewed in Fig. 8) movement of the bristles. The bristles of the brush are so closely arranged so as to, in effect, form a paddle like structure, and when rotating create a partial vacuum at the rear sides thereof. This partial vacuum facilitates the lifting of the lumps of top dressing into the hood thereabove. The brush bristles are preferably formed of steel wires; they beat the lumps of top dressing and also throw the lumps, centrifugally, at a high velocity, against the hood. This combined action causes the lumps to be crushed or pulverized with the result that the top dressing is whirled in powder form within the confines of the hood. The powdered top dressing is indicated at 94. Simultaneously the bristles lift the free ends of the grass blades and runners and while so lifted, the powdered top dressing falls between the lifted blades and runners. Those small lumps which may not be crushed to powder form will be ejected at the rear interior of the hood onto the grass and thus driven to the soil. Thus the brush or rotor 17 not only functions as a pump for lifting the lumps of top dressing into the hood thereabove, but also functions as a centrifugal-type pump throwing the lumps against the inner wall of the hood and downwardly out of the rear of the hood.

The dragging apron or seal 78 provides a seal for the rear end of the hood so that the powdered top dressing will not escape to the atmosphere and be blown away. Also the dragging apron has a slight pressing action on the raised grass blades and runners so as to depress the same somewhat whereby moving currents of air have less effect on removal of the powdered dressing from the soil.

If the surface is covered with debris, such as clippings, twigs, leaves, small stones, paper, etc., the rear hood section is removed and the debris receptacle 85 is attached, as shown in Fig. 4. The brush reel is adjusted so that the bristles provide a sweeping action over the surface. The front hood section is adjusted to a position close to the surface. This adjustment is made so that the bottom edge of the front hood is close enough to just allow the particles of debris to enter the sweeper. Then, as the brush rotates, the particles of debris are discharged forwardly against the inner surface of the front hood section and carried back over the brush reel into the debris receptacle. This action of the sweeper, in addition to removing the surface debris, also raises the nap as previously described.

While the forms of embodiments of the present invention as herein disclosed constitute preferred forms, it is to be understood that other forms might be adopted, all coming within the scope of the claims which follow.

We claim:

1. The steps in the method of spreading particles of top dressing, which are lying on the lawn, onto the soil which comprises placing, over an area of lawn, means having a chamber open to the lawn surface; rotating a member in the chamber and contiguous to the lawn, first to move particles of top dressing upwardly from the lawn and against the walls of the chamber to pulverize the particles upon impact with the walls, and secondly to move the pulverized particles downwardly in said chamber and between the blades of grass or runners of the lawn to the soil.

2. The steps in the method of spreading particles of top dressing, which are lying on the lawn, onto the soil which comprises placing, over an area of lawn, means having a chamber open to the lawn surface; moving particles of top dressing upwardly from the lawn and against the walls of the chamber to pulverize the particles upon impact with the walls; moving the pulverized particles downwardly in said chamber and between the blades of grass or runners of the lawn to the soil and simultaneously raising the free ends of the blades of grass or runners to effect the depositing of the pulverized top dressing on the soil.

3. The steps in the method of spreading particles of top dressing, which are lying on the lawn, onto the soil which comprises placing, over an area of lawn, means having a chamber open to the lawn surfaces; rotating a member in the chamber and contiguous to the lawn, first to transfer particles of the top dressing from the lawn to the chamber, secondly to whirl the particles in the chamber to pulverize the particles upon impact with the inner surface of the chamber, and thirdly to discharge the particles at high velocity from the chamber and between the blades of grass or runners of the lawn to the soil.

4. The steps in the method of spreading particles of top dressing, which are lying on the lawn, onto the soil which comprises placing, over an area of lawn, means having a chamber open to the lawn surface; transferring particles of the top dressing from the lawn to the chamber; whirling the particles in the chamber to pulverize the particles upon impact with the inner surface of chamber; discharging the particles at high velocity from the chamber and between the blades of grass or runners of the lawn to the soil and simultaneously raising the free ends of the blades of grass or runners to effect the depositing of the pulverized top dressing on the soil.

5. The steps in the method of spreading particles of top dressing, which are lying on the lawn, onto the soil which comprises placing, over an area of lawn, means having a chamber open to the lawn surface; rotating a member in the chamber and contiguous to the lawn, first to transfer particles of the top dressing from the lawn to the chamber, secondly to beat the particles in the chamber to pulverize said particles, and thirdly to discharge the particles at high velocity from the chamber and between the blades of grass or runners of the lawn to the soil.

6. The steps in the method of spreading particles of top dressing, which are lying on the lawn, onto the soil which comprises placing, over an area of lawn, means having a chamber open to the lawn surface; transferring particles of the top dressing from the lawn to the chamber; beating the particles in the chamber to pulverize said particles; discharging the particles at high velocity from the chamber and between the blades of grass or runners of the lawn to the soil and simultaneously raising the free ends of the blades of grass or runners to effect the depositing of the pulverized top dressing on the soil.

7. The steps in the method of spreading particles of top dressing, which are lying on the lawn, onto the soil which comprises placing, over an area of lawn, means having a chamber open to the lawn surface; rotating a member in the chamber and contiguous to the lawn, first to transfer particles of the top dressing from the lawn to the chamber, secondly to whirl the particles in the chamber to pulverize the particles upon impact with the inner surface of the chamber, thirdly to beat the particles, simultaneously with said whirling, to pulverize the particles by beating, and fourthly to discharge the particles at high velocity from the chamber and between the blades of grass or runners of the lawn to the soil.

8. The steps in the method of spreading particles of top dressing, which are lying on the lawn, onto the soil which comprises placing, over an area of lawn, means having a chamber open to the lawn surface; and rotating a member in said chamber, first to transfer particles of top dressing from the lawn to the chamber by suction, secondly to centrifugally direct the particles against the chamber walls for pulverizing the particles, and thirdly to discharge the particles downwardly, at high velocity, between the blades of grass or runners of the lawn to the soil.

9. The steps in the method of spreading particles of top dressing, which are lying on the lawn, onto the soil which comprises placing, over an area of lawn, means having a chamber open to the lawn surface; rotating a member in said chamber, first to transfer particles of top dressing from the lawn to the chamber by suction, secondly to centrifgually direct the particles against the chamber walls for pulverizing the particles, and thirdly to discharge the particles downwardly, at high velocity, between the blades of grass or runners of the lawn to the soil and simultaneously raising the free ends of the grass blades or runners to effect the depositing of the pulverized top dressing on the soil.

10. The steps in the method of spreading particles of top dressing, which are lying on the lawn, onto the soil which comprises placing, over an area of lawn, means having a chamber open to the lawn surface; and rotating a member in said chamber and contiguous to the lawn, first to transfer particles of top dressing from the lawn to the chamber by suction, secondly to pulverize the particles by beating, and thirdly to discharge the particles downwardly, at high velocity, between the blades of grass or runners of the lawn to the soil.

11. The steps in the method of spreading particles of top dressing, which are lying on the lawn, onto the soil which comprises placing, over an area of lawn, means having a chamber open to the lawn surface; and rotating a member in said chamber and contiguous to the lawn; first to transfer particles of top dressing from the lawn to the chamber by brush action, secondly to centrifugally direct the particles against the chamber walls for pulverizing the particles, and thirdly to discharge the particles downwardly, at high velocity, between the blades of grass or runners of the lawn to the soil.

12. The steps in the method of spreading particles of top dressing, which are lying on the lawn, onto the soil which comprises placing, over an area of lawn, means having a chamber open to the lawn surface; rotating a member in said chamber, first to transfer particles of top dressing from the lawn to the chamber by brush action, secondly to centrifugally direct the particles against the chamber walls for pulverizing the particles, and thirdly to discharge the particles downwardly, at high velocity, between the blades of grass or runners of the lawn to the soil and simultaneously raising the free ends of the blades of grass or runners to effect the depositing of the pulverized to dressing on the soil.

13. The steps in the method of spreading particles of top dressing, which are lying on the lawn, onto the soil which comprises placing, over an area of lawn, a centrifugal type pumping means including a rotor contiguous to the lawn; actuating said rotor; transferring particles of top dressing from the lawn to the pump by suction of said pump; whirling said particles in the pump to pulverize the particles; and discharging said particles from the pump, at high velocity, downwardly between the blades of grass or runners of the lawn to the soil.

14. The steps in the method of spreading particles of top dressing, which are lying on the lawn, onto the soil which comprises placing, over an area of lawn, a centrifugal type pumping means; actuating said means; transferring particles of top dressing from the lawn to the pump by suction of said pump; whirling said particles in the pump to pulverize the particles, discharging said particles from the pump, at high velocity, downwardly between the blades of grass or runners of the lawn to the soil, and simultaneously raising the free ends of the blades of grass or runners to effect the depositing of the pulverized top dressing on the soil.

References Cited in the file of this patent

UNITED STATES PATENTS

| Number | Name | Date |
|---|---|---|
| 678,461 | Egan | July 16, 1901 |
| 850,777 | Mosher | Apr. 16, 1907 |
| 857,525 | Kern | June 16, 1907 |
| 1,163,948 | Osten | Dec. 14, 1915 |
| 1,173,485 | Coldwell | Feb. 29, 1916 |
| 1,399,634 | Lund | Dec. 6, 1921 |
| 1,695,942 | Atwater | Dec. 18, 1928 |
| 1,987,371 | Rudd | Jan. 8, 1935 |
| 2,011,131 | Willing | Aug. 13, 1935 |
| 2,105,803 | Barnes | Jan. 18, 1938 |
| 2,176,175 | George | Oct. 17, 1939 |
| 2,242,922 | Poynter | May 20, 1941 |
| 2,256,219 | Ronning | Sept. 16, 1941 |
| 2,436,011 | Lucas | Feb. 17, 1948 |
| 2,443,785 | Burg | June 22, 1948 |
| 2,449,042 | Abbrecht | Sept. 14, 1948 |
| 2,517,292 | Dewey | Aug. 1, 1950 |
| 2,517,855 | Elliott | Aug. 8, 1950 |